(12) United States Patent
Johnson

(10) Patent No.: US 6,349,573 B1
(45) Date of Patent: Feb. 26, 2002

(54) VEHICLE ANTI-THEFT DEVICE

(76) Inventor: Milton Johnson, 2288 Wallingford Dr., Decatur, GA (US) 30032

( * ) Notice: Subject to any disclaimer, the term of this patent is extended or adjusted under 35 U.S.C. 154(b) by 0 days.

(21) Appl. No.: 09/571,201

(22) Filed: May 16, 2000

(51) Int. Cl.[7] .............................................. B60R 25/00
(52) U.S. Cl. ................................ 70/14; 70/94; 70/101; 292/289
(58) Field of Search ................................ 70/14, 19, 94, 70/101, 209; 292/259 R, 259 A, 288, 289

(56) References Cited

U.S. PATENT DOCUMENTS

| | | | | |
|---|---|---|---|---|
| 4,312,452 A | | 1/1982 | Waier ........................... 211/23 |
| 4,437,697 A | * | 3/1984 | Hinojos ....................... 293/118 |
| 4,819,461 A | | 4/1989 | Pearson .......................... 70/14 |
| 5,035,458 A | * | 7/1991 | Boensch ...................... 296/1.1 |
| 5,314,040 A | | 5/1994 | Rivera ......................... 180/287 |
| 5,388,435 A | * | 2/1995 | Bailey .......................... 70/211 |
| 5,520,030 A | | 5/1996 | Muldoon ........................ 70/14 |
| 5,562,177 A | | 10/1996 | Chacon ....................... 180/287 |
| 5,582,046 A | | 12/1996 | Baumwoll et al. ............. 70/237 |

* cited by examiner

*Primary Examiner*—William A. Cuchlinski, Jr.
*Assistant Examiner*—Arthur D. Donnolly
(74) *Attorney, Agent, or Firm*—Kenneth L. Tolar

(57) ABSTRACT

A vehicle anti-theft device includes a frame for securing over a vehicle door. The frame includes one or more support legs each having an upper arm slidably mounted thereon for securing between the top of the vehicle window frame and the vehicle roof. The support leg includes a lower arm for attaching to a vehicle jack rail or similar plate mounted beneath the vehicle. A locking means secures the upper arm at a select position relative to the support leg to tightly fasten the frame about the vehicle door thereby preventing an unauthorized user from opening the door.

5 Claims, 2 Drawing Sheets

VEHICLE ANTI-THEFT DEVICE

BACKGROUND OF THE INVENTION

The present invention relates to an anti-theft device for a vehicle.

DESCRIPTION OF THE PRIOR ART

Vehicle thefts continue to be a problem since locked vehicle doors are susceptible to unauthorized entry. Once inside the passenger compartment, a thief can easily hot wire the vehicle and break the steering wheel lock. The present invention provides a frame which may be locked over vehicle door to prevent the door from being opened.

Various vehicle anti-theft devices exist in the prior art. For example, U.S. Pat. No. 4,312,452 issued to Waier relates to a frame into which the front end of a vehicle is driven. The frame includes adjustable bars allowing the frame to be clamped tightly against the vehicle.

U.S. Pat. No. 4,819,461 issued to Pearson relates to a locking device to secure the rear door and tailgate of a truck having a canopy and rear bumper. The locking device includes an elongated member having a loop at the upper end for securing to the handle of the truck canopy and a lower member with orifices. The lower member vertically extends through an orifice on the bumper. A lock is then secured within the orifices.

U.S. Pat. No. 5,314,040 issued to Rivera relates to a vehicle anti-theft device that alerts the observing public that the vehicle has been stolen. The device includes a broad, flat, brightly colored strap having a message thereon. The strap is normally stored between the hood and windshield. The strap may be locked across the windshield when the vehicle is left unattended whereby a thief must either break the windshield to remove the strap or drive the vehicle with the strap in plain view.

U.S. Pat. No. 5,520,030 issued to Muldoon relates to a goose neck trailer locking apparatus.

U.S. Pat. No. 5,562,177 issued to Chacon discloses an anti-theft system including an extendable bar permanently carried by the vehicle. The extendable bar is movable between an extended position for locking the vehicle in place and a retracted position when the vehicle is in use.

U.S. Pat. No. 5,582,046 issued to Baumwoll et al discloses a vehicle access preventive device including a hook member adapted to engage a post on the inner surface of a door frame and an outer module adapted to abut against an outer surface of the door. A strap is attached between the hook member and the outer module and is disposed between the door and frame.

The present invention provides a uniquely configured adjustable frame assembly for mounting to a vehicle door to prevent the door from being opened by an unauthorized user.

SUMMARY OF THE INVENTION

The present invention relates to a vehicle anti-theft device including a frame member for securing over a vehicle door. The frame member includes a pair of vertical legs each having an L-shaped upper arm slidably mounted thereon. A locking mechanism secures the upper arms at a select position relative to the leg allowing the frame to be tightly clamped to varying size vehicle doors. Attached to the lower end of each bar is a lower arm including a vertical slot thereon for receiving a jack rail or similar plate mounted beneath the vehicle. A transverse cross-bar may interconnect the two support legs. It is therefore an object of the present invention to provide a vehicle anti-theft device that is easy to install.

It is another object of the present invention to provide a vehicle anti-theft device that prevents a vehicle door from being opened by an unauthorized user.

It is yet another object of the present invention to provide a vehicle anti-theft device that is adjustable to fit varying size vehicle doors and which may be used with either two or four door models. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
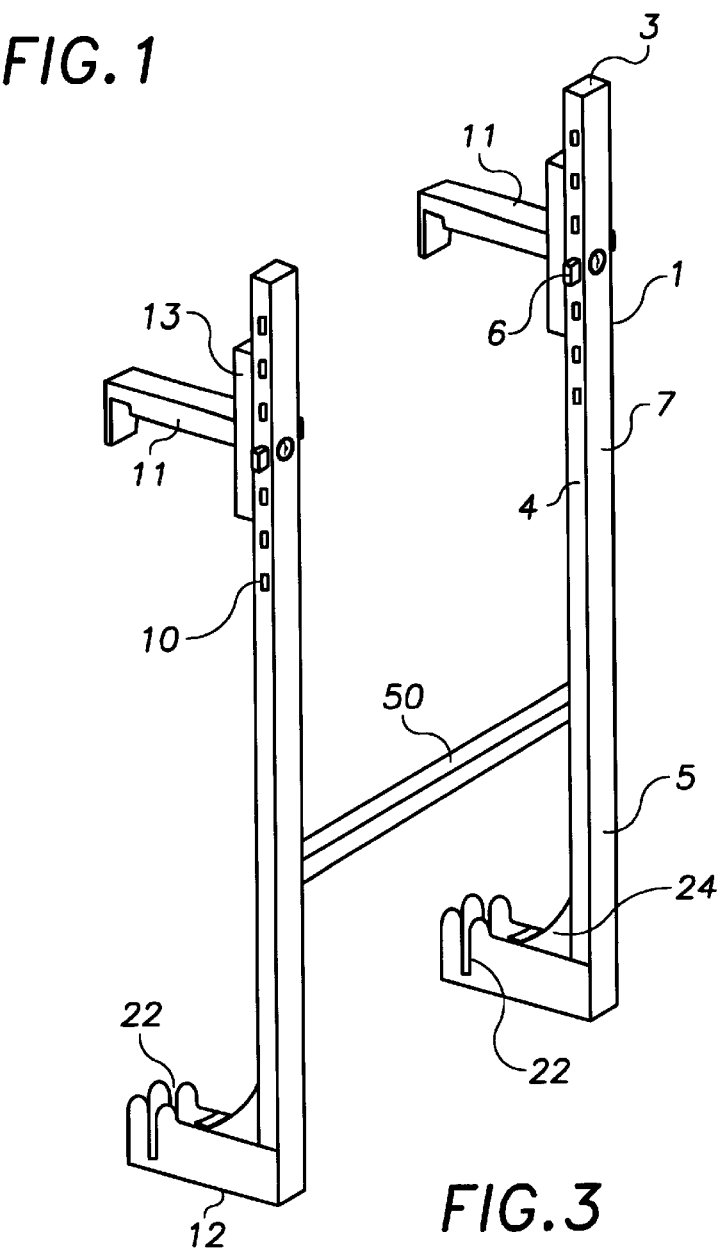
FIG. 1 is a perspective view of the anti-theft device.

Referring now to FIGS. 1 through 4, the vehicle anti-theft device according to the present invention includes a frame member for clamping to a vehicle door. The frame member comprises at least one elongated vertical support leg 1 having an upper end 3, a lower end 5, two opposing sides 4, a front surface 7 and a rear surface 9. Slidably mounted on the rear surface of each support leg is a substantially L-shaped upper locking arm 11. Each upper arm is attached to a sliding block 13, a portion 15 of which is slidably received within a longitudinal slot on the rear surface of the support leg.

Figure 3:
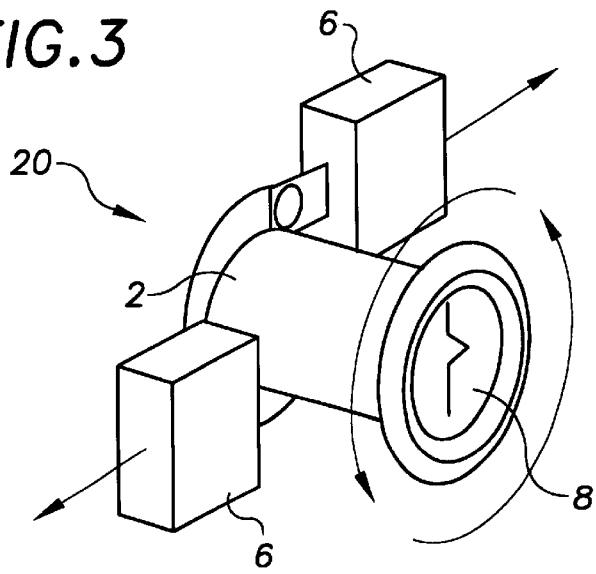
FIG. 3 is a detailed view of the locking mechanism.
Figure 2:
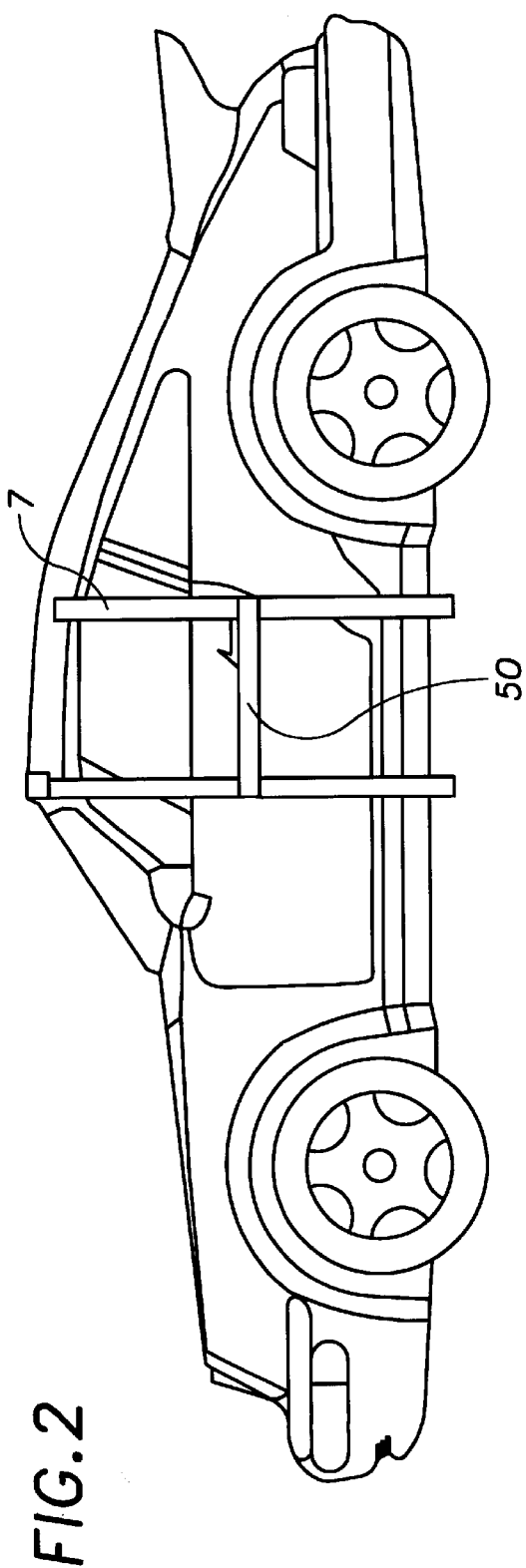
FIG. 2 depicts the device installed on a two door vehicle.
Figure 4:
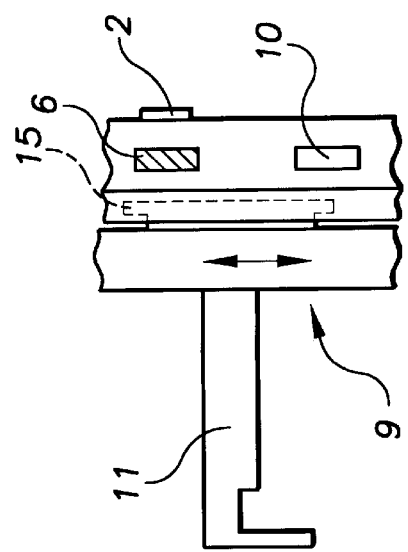
FIG. 4 is a detailed view of an upper locking arm.

The upper arm may be secured in a select position on the support leg with a locking mechanism 20 as depicted in FIG. 3. The locking mechanism includes a cylinder 2 having a pair of opposing, outwardly extending latch members 6 pivotally attached to the rear end thereof. On the front end of the cylinder is a keyway 8 for receiving a key to selectively rotate the cylinder in a predetermined direction. On each of the two opposing sides of the support legs are a plurality of vertically aligned apertures 10, each positioned, configured and dimensioned to receive a latch member when aligned therewith as the cylinder is rotated to extend the latch members outwardly. Accordingly, inserting a key into the keyway and rotating the cylinder in a first direction will retract the latch members within the support legs allowing the upper arms to be slid relative thereto. Rotating the cylinder in an opposite direction will extend the latch members outwardly and into a select pair of apertures thereby locking the upper arm at the select position. The cylinder is likewise slidable within the leg and is accessible via a longitudinal slot on the front surface thereof.

Attached to the lower end of each support leg is a lower arm 12 formed of a pair of opposing spaced vertical panels each having a vertical slot 22 thereon. The slots receive a vehicle jack rail that is mounted beneath certain vehicles. If the vehicle is not equipped with a jack rail, a similar metal plate is mounted to the underside of the vehicle. On the upper surface of the lower arm is an arcuate bumper member 24 preferably constructed with rubber or a similar material. The bumper minimizes damage to the exterior of the vehicle when the device is clamped thereto. The frame described above may include a single leg or two legs interconnected with a transverse cross-member 50.

To use the above described device, the frame member is extended and the upper arm is secured between the top end of the vehicle door window frame and the vehicle roof. Using the key, the latches are retracted within each support leg allowing the support leg and lower arm to be slid upwardly until the jack rail is tightly received within the slot on the lower arm. Once the frame is tightly secured in position, the key is rotated in an opposite direction to extend the latches into the respective apertures thereby locking the device in place. If the device is being used with a four door vehicle, one of the upper arms may be secured to the top of the front door while the other upper arm is secured to the top of the rear door.

The above described device is preferably constructed with steel, stainless steel or a similar material. However, as will be readily apparent to those skilled in the art, size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A vehicle anti-theft device comprising:
    at least one elongated support leg having an upper end and a lower end with an upper arm slidably mounted thereon, said arm for securing between a vehicle door frame and a vehicle roof;
    a lower arm mounted to the lower end of said leg, said lower arm adapted to be secured to an undersurface of a vehicle;
    a locking means for locking the upper arm at a select position relative to the support leg.

2. A vehicle anti-theft device according to claim 1 wherein said locking means comprises:
    a cylinder rotatably mounted to said upper arm, said cylinder having a keyway thereon for receiving a key to selectively rotate said cylinder;
    a pair of opposing latches pivotably mounted to said cylinder, said cylinders extended and retracted upon rotation of said cylinder in a predetermined direction;
    a plurality of apertures disposed on each of two opposing sides of said support leg, each aperture positioned and dimensioned to receive one of said latches when said latches are extended to lock said arm at a select position.

3. A vehicle anti-theft device according to claim 1 wherein said lower arm includes a slot thereon for receiving a plate mounted to the undersurface of the vehicle.

4. A vehicle anti-theft device according to claim 3 wherein said lower arm further includes a bumper member on the upper surface thereof for minimizing damage to a vehicle when thrust thereagainst.

5. A vehicle anti-theft device according to claim 1 further comprising a second support leg interconnected with said at least one support leg using a transverse cross bar.

* * * * *